United States Patent

Herzig et al.

Patent Number: 5,015,700
Date of Patent: May 14, 1991

[54] ANHYDRIDE-FUNCTIONAL ORGANO/(POLY)SILOXANES, A PROCESS FOR PREPARING THE SAME AND USES THEREOF

[75] Inventors: Christian Herzig, Taching; Josef Esterbauer, Hochburg, both of Fed. Rep. of Germany

[73] Assignee: Wacker-Chemie GmbH, Munich, Fed. Rep. of Germany

[21] Appl. No.: 563,160

[22] Filed: Aug. 6, 1990

[30] Foreign Application Priority Data

Aug. 18, 1989 [DE] Fed. Rep. of Germany ....... 3927312

[51] Int. Cl.$^5$ ............................................. C08F 283/00
[52] U.S. Cl. ..................... 525/487; 528/15; 528/23; 528/12; 528/29; 528/26; 528/31; 528/28; 525/523
[58] Field of Search .................. 528/15, 23, 12, 29, 528/26, 31, 28; 525/487, 523

[56] References Cited

U.S. PATENT DOCUMENTS 4,923,948   5/1990   Matsuki et al. ................. 528/26

FOREIGN PATENT DOCUMENTS 0176085   4/1986   European Pat. Off. .

Primary Examiner—Melvyn I. Marquis
Assistant Examiner—M. Glass

[57] ABSTRACT

Anhydride-functional organo(poly)siloxanes having average units of the general formula

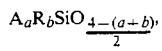

$$A_a R_b SiO_{\frac{4-(a+b)}{2}}, \quad (I)$$

in which the R(s) are the same or different and represent a monovalent hydrocarbon radical or a monovalent halogenated hydrocarbon radical having from 1 to 18 carbon atom(s) per radical, A represents a radical of the formula

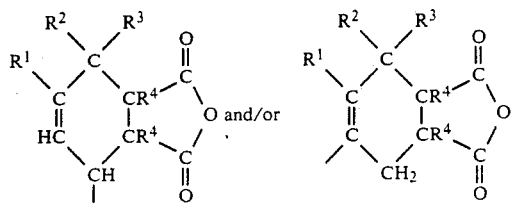

in which $R^1$ represents a hydrogen atom or a monovalent hydrocarbon radical or a monovalent halogenated hydrocarbon radical having from 1 to 12 carbon atom(s) per radical and $R^2$ represents a hydrogen atom or a monovalent hydrocarbon radical having from 1 to 12 carbon atom(s) per radical, or the two radicals R and $R^2$ together represent a divalent hyrocarbon radical having from 3 to 5 carbon atoms per radical, $R^3$ represents a hydrogen atom or a monovalent hydrocarbon radical having from 1 to 4 carbon atom(s) per radical, with the proviso that $R^3$ is a hydrogen atom if the two radicals $R^1$ and $R^2$ together represent a divalent hydrocarbon radical having from 3 to 5 carbon atoms per radical, $R^4$, which may be the same or different, represent a hydrogen atom, a halogen atom or a cyano radical, a is 0 or 1, with an average of from 0.003 to 1.0, b is 0, 1, 2 or 3, with an average of from 0.05 to 2.5, and the sum of a+b is an average which is not greater than 3, with the proviso that at least one A radical is present per molecule.

16 Claims, No Drawings

ANHYDRIDE-FUNCTIONAL ORGANO/(POLY)SILOXANES, A PROCESS FOR PREPARING THE SAME AND USES THEREOF

Anhydride-functional organo(poly)siloxanes, such as organo(poly)siloxanes containing norbornene anhydride and norbornane anhydride as functional groups are known. The preparation of norbornene anhydride containing organo(poly)siloxanes are described in Chemical Abstracts 72,32777m, 1970, in which maleic anhydride is reacted with an organo-(poly)siloxane containing SiC-linked cyclopentadiene groups to form an organo(poly)siloxane containing 5-norbornene-2,3-carboxylic anhydride groups. Norbornane anhydride containing organo(poly)siloxanes are prepared in accordance with U.S. Pat. No. 4,381,396 to Hong-Son Ryang, in which norbornene anhydrides are added to silanes or organo(poly)siloxanes containing Si-linked hydrogen in the presence of platinum catalysts. Organo(poly)siloxane/polyimide copolymers based on organo(poly)siloxanes having terminal norbornane anhydride groups, organic diamines, and if appropriate, other aromatic bisanhydrides are described in U.S. Pat. No. 4,404,350 to Hong-Son Ryang. Curable epoxy resin compositions using organo(poly)siloxanes containing norbornane anhydride as functional groups are known from U.S. Pat. No. 4,511,701 to Hong-Son Ryang. A 4-silyl-substituted 1,2,3,6-tetrahydrophthalic anhydride which is prepared by a three-stage process is described in EP-A 176,085 (laid open on Apr. 2, 1986, Sato Fumie, Nissan Chemical Industries Ltd.). In the first stage 1,4-dichlorobutyne is added in the presence of a platinum catalyst to a silane containing Si-linked hydrogen, the addition product is reduced by means of zinc in the 2nd stage to form a 2-silyl-substituted 1,3-butadiene, and in a 3rd stage, maleic anhydride is added on in a Diels-Alder reaction.

The addition of 3-methyl-1-butyn-3-ol onto organosilicon compounds containing Si-linked hydrogen in the presence of hexachloroplatinic acid is described in U.S. Pat. No. 2,823,218 to Speier et al. It is also known from Chemical Abstracts 51, 9474f, 1957, that 2-triethylsilyl-3-methyl-1,3-butadiene can be obtained by the elimination of water when 2-triethylsilyl-3-methyl-1-buten-3-ol is heated in the presence of $KHSO_4$.

It is, therefore, an object of the present invention to provide anhydride-functional organo(poly)siloxanes which can be prepared in good yields from readily available materials, without having to use large amounts of expensive platinum catalyst. Another object of the present invention is to provide a process for preparing anhydride-functional organo(poly)siloxanes in a single reaction vessel.

A further object of the present invention is to provide a process for preparing anhydride-functional organo(poly)siloxanes by reacting maleic anhydride with a butadienyl-functional organo(poly)siloxane without first having to isolate the butadienyl-functional organo(poly)siloxane.

SUMMARY OF THE INVENTION

The foregoing objects and others which will become apparent from the following description are accomplished in accordance with this invention, generally speaking, by providing anhydride-functional organo(poly)siloxanes having average units of the general formula $$A_a R_b SiO_{\frac{4-(a+b)}{2}} \quad (I)$$

in which the R(s) are the same or different and represents a monovalent hydrocarbon radical or a monovalent halogenated hydrocarbon radical having from 1 to 18 carbon atom(s) per radical, A represents a radical of the formula

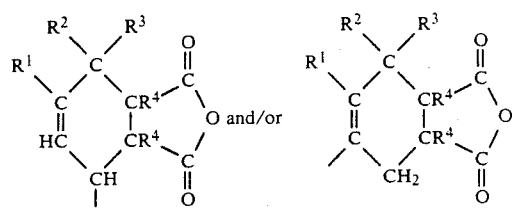

in which $R^1$ represents a hydrogen atom or a monovalent hydrocarbon radical or a monovalent halogenated hydrocarbon radical having from 1 to 12 carbon atom(s) per radical and $R^2$ represents a hydrogen atom or a monovalent hydrocarbon radical having from 1 to 12 carbon atom(s) per radical, or the two radicals $R^1$ and $R^2$ together represent a divalent hydrocarbon radical having from 3 to 5 carbon atoms per radical, $R^3$ represents a hydrogen atom or a monovalent hydrocarbon radical having from 1 to 4 carbon atom(s) per radical, with the proviso that $R^3$ is a hydrogen atom if the two radicals $R^1$ and $R^2$ together represent a divalent hydrocarbon radical having from 3 to 5 carbon atoms per radical, $R^4$, which may be the same or different, represents a hydrogen atom, a halogen atom or a cyano radical, a is 0 or 1, with an average of from 0.003 to 1.0, b is 0, 1, 2 or 3, with an average of from 0.05 to 2.5, and the sum of a+b is an average which is not greater than 3, with the proviso that at least one A radical is present per molecule.

The invention also relates to a process for preparing the anhydride-functional organo(poly)siloxanes, which comprises initially reacting, in a 1st stage, a secondary or tertiary acetylenic alcohol (1) with an organo(poly)siloxane (2) having at least one Si-linked hydrogen atom in the presence of a catalyst (3) which promotes the addition of Si-linked hydrogen to an aliphatic multiple bond, and then, in a 2nd stage, reacting the alkenol groups of the organo(poly)siloxane obtained in the 1st stage with maleic anhydride or a substituted maleic anhydride, and if appropriate, in the presence of an acid catalyst, in which water is eliminated by an intramolecular reaction from the alkenol groups and maleic anhydride or a substituted maleic anhydride is then added thereto in accordance with the Diels-Alder reaction, and if appropriate, in a 3rd stage, equilibrating the organo(poly)siloxane containing anhydride groups, prepared in the 2nd stage, with an organo(poly)siloxane (4) selected from the group consisting of linear organo(poly)siloxanes having terminal triorganosiloxy groups, linear organo(poly)siloxanes having terminal hydroxyl groups, cyclic organo(poly)siloxanes and copolymers formed from diorganosiloxane and monoorganosiloxane units.

The invention also relates to the use of the anhydride-functional organo(poly)siloxanes in the preparation of organo(poly)siloxane/polyamide copolymers and as curing agents for epoxy resins.

DESCRIPTION OF THE INVENTION

In contrast with the process described in EP-A No. 176,085 mentioned above, the organo(poly)siloxanes of this invention can be prepared by a simple process. It was surprising and could not have been predicted, either from the above mentioned publications EP-A No. 176,085; U.S. Pat. No. 2,823,218 or Chemical Abstracts 51, 9474f, 1957 or from the combination of these publications, that maleic anhydride could be added without first isolating the butadienyl-functional organo(poly)siloxane and that the whole process could be carried out in a single reaction vessel, i.e., in a one-pot process, as it is called, and that the anhydride-functional organo(poly)siloxanes could be obtained from this process in good yields.

Examples of radicals represented by R are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; cycloalkyl radicals, such as the cyclopentyl, cyclohexyl, cycloheptyl and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the $\alpha$-phenylethyl and $\beta$-phenylethyl radicals. Preferred examples of R radicals are the methyl and phenyl radicals.

Examples of halogenated radicals represented by R are halogenoalkyl radicals, such as the 3,3,3-trifluoro-npropyl radical, the 2,2,2,2',2',2'-hexafluoroisopropyl radical and the heptafluoroisopropyl radical, and halogenoaryl radicals, such as the o-, m- and p-chlorophenyl radical.

Examples of hydrocarbon radicals represented by $R^1$ are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical, and isooctyl radicals, such as the 2,2,4-trimethylpentyl radical; aryl radicals, such as the phenyl radical; alkaryl radicals, such as o-, m- and p-tolyl radicals, xylyl radicals and ethylphenyl radicals; and aralkyl radicals, such as the benzyl radical.

Examples of halogenated hydrocarbon radicals represented by $R^1$ are halogenoalkyl radicals, such as 1,1,1-trichloromethyl radical, the 3,3,3-trifluoro-n-propyl radical, the 2,2,2,2',2',2'-hexafluoroisopropyl radical and the heptafluoroisopropyl radical, and halogenoaryl radicals, such as the o-, m- and p-chlorophenyl radicals.

The $R^1$ radical is preferably a methyl or phenyl radical and more preferably a methyl radical.

Examples of hydrocarbon radicals represented by $R^2$ are alkyl radicals, such as the methyl, ethyl, n-propyl, isopropyl, 1-n-butyl, 2-n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, and dodecyl radicals, such as the n-dodecyl radical.

Examples of hydrocarbon radicals represented by $R^3$ are alkyl radicals, such as the methyl, ethyl, n-propyl, isopropyl, 1-n-butyl, 2-n-butyl, isobutyl and tert-butyl radical.

Examples of radicals in which the radicals $R^1$ and $R^2$ together represent a divalent hydrocarbon radical having from 3 to 5 carbon atoms are those of the formulas $-(CH_2)_3-$, $-(CH_2)_4-$, $-CH(CH_3)-(CH_2)_3-$, $-CH_2-CH(CH_3)-(CH_2)_2-$ and $-(CH_2)_5-$, with the $-(CH_2)_4-$ radical being preferred.

The radical $R^2$ is preferably a hydrogen atom or a methyl radical and more preferably a hydrogen atom.

The radicals $R^3$ and $R^4$ are each preferably a hydrogen atom.

Formula (I) which represents the anhydride-functional organo(poly)siloxanes of this invention includes linear, branched and cyclic organo(poly)siloxanes.

The average molecular weight of the anhydride-functional organo(poly)siloxanes of this invention is preferably from 298 to 100,000 g/Mole, and more preferably from 462 to 20,000 g/Mole.

Examples of anhydride-functional organo(poly)siloxanes are those of the formulas $XMe_2SiO(SiMe_2O)_8SiMe_2X$ $XMe_2SiOSiMe_2X$ $XMe_2SiO(SiMe_2O)_{65}SiMe_2X$ $Me_3SiOSiMeXOSiMe_3$ $Me_3SiO(SiMeXO)_7(SiMe_2O)_{15}SiMe_3$ $Me_3SiO(SiMeXO)_5SiMe_3$ $Me_3SiO(SiMeXO)_3(SiMe_2O)_{200}SiMe_3$ $XMe_2SiO(SiMeXO)_3(SiMe_2O)_{95}SiMe_2X$ $(SiMeXO)_4$ $XMe_2SiO(SiMe_2O)_{19}(SiMePhO)_5SiMe_2X$ $$\begin{array}{c}
\text{Me} \quad\quad \text{Ph} \quad\quad \text{Me} \\
| \quad\quad\quad | \quad\quad\quad | \\
X-\text{Si}-\text{O}-\text{Si}-\text{O}-\text{Si}-X \\
| \quad\quad\quad | \quad\quad\quad | \\
\text{O} \quad\quad\quad \text{O} \quad\quad\quad \text{O} \\
| \quad\quad\quad | \quad\quad\quad | \\
X-\text{Si}-\text{O}-\text{Si}-\text{O}-\text{Si}-X \\
| \quad\quad\quad | \quad\quad\quad | \\
\text{Me} \quad\quad \text{Ph} \quad\quad \text{Me}
\end{array}$$

$YMe_2SiO(SiMe_2O)_6SiMe_2Y$ and
$ZMe_2SiO(SiMe_2O)_8SiMe_2Z$, in which Me represents a methyl radical, Ph represents a phenyl radical, X represents a radical of the formula $$\begin{array}{cc}
H_3C\diagdown\quad\diagup CH_2\quad\overset{O}{\underset{\|}{C}} & H_3C\diagdown\quad\diagup CH_2\quad\overset{O}{\underset{\|}{C}} \\
C\quad\quad\quad CH\diagdown & C\quad\quad\quad CH\diagdown \\
\|\quad\quad\quad |\quad\quad O\text{ and/or} & \|\quad\quad\quad |\quad\quad O \\
HC\diagdown\quad\diagup CH\diagup & C\diagdown\quad\diagup CH\diagup \\
CH\quad\overset{C}{\underset{\|}{O}} & CH_2\quad\overset{C}{\underset{\|}{O}}
\end{array}$$

Y represents a radical of the formula

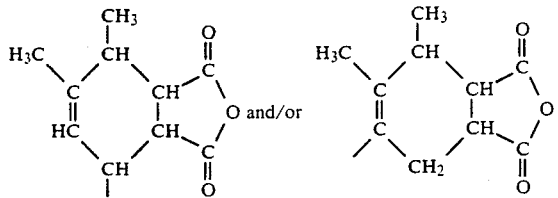

and Z represents a radical of the formula

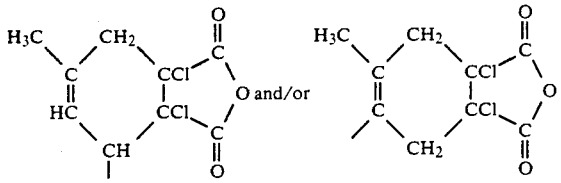

Preferred anhydride-functional organo(poly)siloxanes are those of the general formula $$A_dR_{3-d}SiO(SiR_2O)_n(SiRAO)_mSiR_{3-d}A_d \quad (II)$$

in which R and A are the same as above, d is 0 or 1, n is 0 or an integer of from 1 to 1,500 and m is 0 or an integer of from 1 to 200, with the proviso that at least one radical A is present per molecule and the ratio of n:m is not greater than 200.

Secondary or tertiary acetylenic alcohols (1) which are preferably used in the process of this invention are those of the general formula $$HC\equiv C-C(OH)R^1-CHR^2R^3,$$

in which $R^1$, $R^2$ and $R^3$ are the same as above.

Examples of secondary and tertiary acetylenic alcohols (1) which are employed in the process of this invention are 2-methyl-3-butyn-2-ol, 3-methyl-4-pentyn-3-ol, 1-ethynylcyclohexan-1-ol, 3-ethyl-4-pentyn-3-ol, 2-phenyl-3-butyn-2-ol, 1-ethynylcyclopentan-1-ol and 3-phenyl-4-pentyn-3-ol. The preferred acetylenic alcohols (1) are 2-methyl-3-butyn-2-ol, 3-methyl-4-pentyn-3-ol and 1-ethynylcyclohexan-b 1-ol, with 2-methyl-3-butyn-2-ol being more preferred.

Processes for preparing acetylenic alcohols (1) are known to those skilled in the art. Acetylenic alcohols (1) are obtained, for example, by the Reppe process where acetylene and carbonyl compounds are reacted in accordance with the following equation:

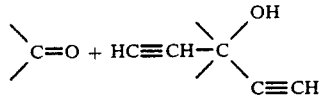

Organo(poly)siloxanes (2) having at least one Si-linked hydrogen atom which can be used in the process of this invention are also the same linear, branched or cyclic organo(poly)siloxanes having at least one Si-linked hydrogen atom which have been or could have been employed heretofore in the addition of compounds containing an aliphatic multiple bond to organo(poly)siloxanes containing Si-linked hydrogen in the presence of catalysts which promote the addition of Si-linked hydrogen to an aliphatic multiple bond. Organo(poly)siloxanes (2) having at least one Si-linked hydrogen atom which are preferably employed are those of the general formula $$H_eR_fSiO_{\frac{4-(e+f)}{2}} \quad (III)$$

in which R is the same as above, e is 0 or 1, with an average of from 0.003 to 1.0, f is 0, 1, 2 or 3, with an average of from 0.05 to 2.5, and the sum of e+f is not greater than 3. The above formula includes not only linear and branched organo(poly)siloxanes, but also cyclic organo(poly)siloxanes. The average viscosity of the organo(poly)siloxanes (2) is preferably from 0.5 to 1,000,000 mPa.s, and more preferably from 0.5 to 10,000 mPa.s.

Organo(poly)siloxanes (2) having at least one Si-linked hydrogen which are preferably employed are those of the general formula $$H_dR_{3-d}SiO(SiR_2O)_o(SiRHO)_pSiR_{3-d}H_d \quad (IV)$$

in which R and d are the same as above, o is 0 or an integer of from 1 to 1,500 and p is 0 or an integer of from 1 to 200, with the proviso that the ratio of o:p is not greater than 200. Methyl or phenyl radicals are especially preferred as the R radicals in the above formula.

Examples of organo(poly)siloxanes (2) are copolymers formed from dimethylhydrogensiloxane and dimethylsiloxane units, copolymers formed from dimethylhydrogensiloxane, dimethylsiloxane and methylhydrogensiloxane units, copolymers formed from trimethylsiloxane and methylhydrogensiloxane units, copolymers formed from trimethylsiloxane, dimethylsiloxane and methylhydrogensiloxane units, copolymers formed from dimethylhydrogensiloxane, dimethylsiloxane and phenylmethylsiloxane units, cyclic methylhydrogenpolysiloxanes, copolymers formed from dimethylhydrogensiloxane and methylsiloxane units and copolymers formed from dimethylhydrogensiloxane and phenylsiloxane units.

Processes for preparing the organo(poly)siloxanes (2), including those of the preferred type, are generally known.

The acetylenic alcohol (1) is preferably employed in the addition reaction carried out in the 1st stage of the process of this invention in quantities such that 0.9 to 3.0 moles, preferably 1.05 to 1.10 moles, of acetylenic alcohol (1) are present per gram atom of Si-linked hydrogen in the organo(poly)siloxane (2).

The catalysts (3) which promote the addition of Si-linked hydrogen to an aliphatic multiple bond in the process of this invention can also be the same catalysts which have been or could have been employed heretofore in promoting the addition of Si-linked hydrogen to an aliphatic multiple bond. The catalysts (3) are preferably a metal from the group of the platinum metals or a compound or a complex from the group of the platinum metals. Examples of such catalysts are metallic and finely divided platinum, which can be supported on carriers, such as, silicon dioxide, aluminum oxide or activated charcoal, compounds or complexes of platinum, such as platinum halides, for example, $PtCl_4$, $H_2PtCl_6\cdot 6H_2O$, $Na_2PtCl_4\cdot 4H_2O$, platinum/olefin complexes, platinum/alcohol complexes, platinum/alcoholate complexes, platinum/ether complexes, platinum/aldehyde complexes, platinum/ketone complexes, including reaction products formed from $H_2PtCl_6\cdot 6H_2O$ and cyclohexanone, platinum/vinylsiloxane complexes, such as platinum-1,3-divinyl-1,1,3,3-tetramethyldisiloxane complexes with or without detectable inorganically linked halogen, bis-(gamma-picoline)-platinum dichloride, trimethylenedipyridine/platinum dichloride, dicyclopentadiene/platinum dichloride, dimethylsulfoxide ethylene platinum-(II) dichloride and reaction products of platinum tetrachloride with an olefin and a primary or secondary amine or a primary and a secondary amine as specified in U.S. Pat. No. 4,292,434, such as the reaction product of platinum tetrachloride dissolved in 1-octene with sec-butylamine, or ammonium/platinum complexes, such as specified in EP-B No. 110,370.

The catalyst (3) is preferably employed in an amount of from 0.5 to 200 ppm by weight (parts by weight per million parts by weight), preferably in an amount of from 1 to 50 ppm by weight, calculated as elemental platinum and based on the total weight of acetylenic alcohol (1) and organo(poly)siloxane (2) containing at least one Si-linked hydrogen atom.

The addition reaction (or hydrosilylation reaction) in the 1st stage of the process of this invention is preferably carried out under the pressure of the ambient atmosphere, that is to say at about 1,020 hPa (abs.), however, it can also be carried out under higher or lower pressures. The addition reaction is also preferably carried out at a temperature of from 70° C. to 150° C., and more preferably from 100° C. to 120° C.

A mixture of isomers, represented by the following equation is formed in the hydrosilylation carried out in the 1st stage of the process of this invention:

$$\equiv Si-H + H-C\equiv C-C(OH)R^1-CHR^2R^3 \longrightarrow \quad (B)$$

$$\equiv Si-CH=CH-C(OH)R^1-CHR^2R^3 +$$

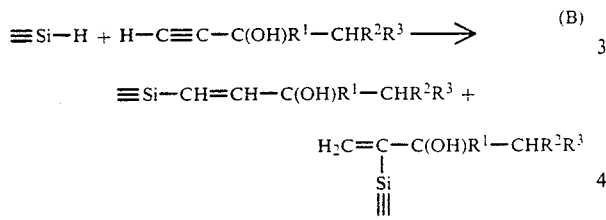

The organo(poly)siloxanes obtained in the 1st stage thus contain Si-linked alkenol groups of the formula:

$$-CH=CH-C(OH)R^1-CHR^2R^3 \text{ and/or}$$

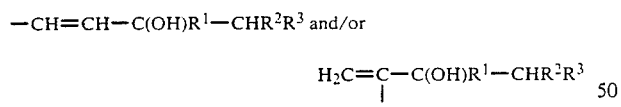

Excess acetylenic alcohol (1) is removed by distillation from the organo(poly)siloxane obtained in the 1st stage of the process of this invention.

The maleic anhydride or substituted maleic anhydride employed in the 2nd stage of the process of this invention is preferably a maleic anhydride of the formula

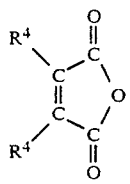

in which $R^4$ is the same as above. It is preferred that maleic anhydride be employed in the 2nd stage of the process of this invention.

Maleic anhydride or a substituted maleic anhydride is preferably employed in the 2nd stage of the process of this invention in amounts of from 1.2 to 2.0 Moles, and more preferably from 1.2 to 1.5 Moles, per Mole of acetylenic alcohol (1).

In the 2nd stage of the process of this invention, the organo(poly)siloxanes containing alkenol groups which are prepared in the 1st stage, are reacted with maleic anhydride or a substituted maleic anhydride, and if appropriate, in the presence of an acid catalyst, with the elimination of water by an intramolecular reaction with the alkenol groups of the organo(poly)siloxanes, and the maleic anhydride or a substituted maleic anhydride is added in accordance with the Diels-Alder reaction. The 2nd stage of the process of this invention is further illustrated by the following equation:

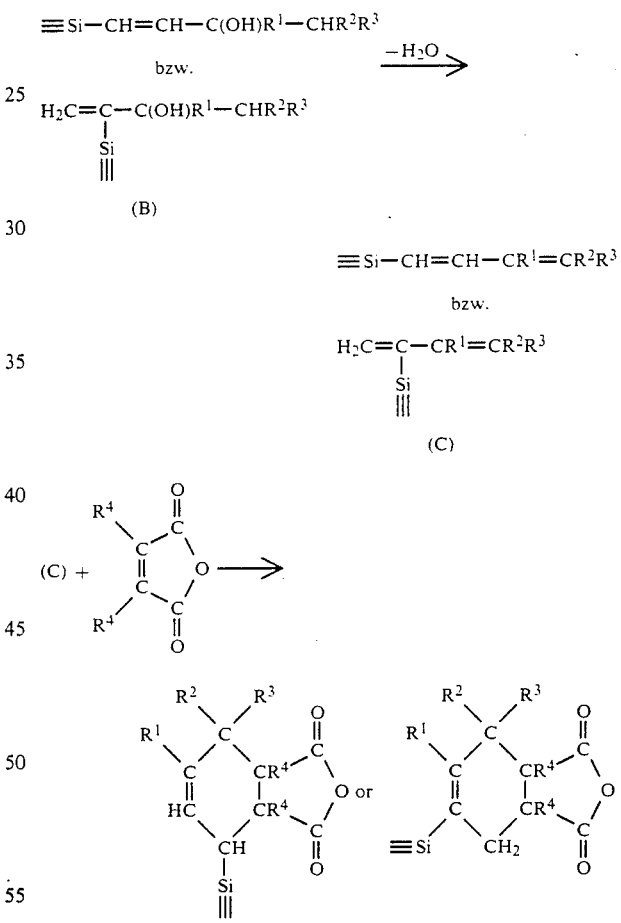

Examples of acid catalysts which are optionally added in the 2nd stage of the process of this invention are perchloric acid, sulfuric acid, phosphoric acid, hexafluorophosphoric acid, trichloroacetic acid, fumaric acid, trifluoromethanesulfonic acid, p-toluenesulfonic acid and strong acid ion exchangers and clays. It is preferred that the acid catalysts be used in an amount of from 5 to 1,000 ppm by weight, based on the weight of the organo(poly)siloxane (B) having alkenol groups which is obtained in the 1st stage of the process of this invention.

The intramolecular elimination of the elements of water and the Diels-Alder reaction in the 2nd stage of the process of this invention are preferably carried out at 80° C. to 150° C., and more preferably from 100° C. to 130° C., and under the pressure of the ambient atmosphere, that is at about 1,020 hPa (abs.). If desired, however, it is also possible to use higher or lower pressures.

It is preferable to use inert, water-immiscible solvents in the 2nd stage of the process of this invention. Examples of inert, water-immiscible solvents are mixtures of xylene isomers, toluene and cyclohexane. The inert, water-immiscible solvent is preferably used in an amount of from 10 to 40 percent by weight, based on the weight of the organo(poly)siloxane (B) having alkenol groups which is obtained in the 1st stage of the process of this invention. The organic solvent serves not only as a homogenizing medium, but also serves to facilitate the removal of the water of reaction formed in the 2nd stage of the process of this invention. In this process, it is preferred that the water of reaction be removed by azeotropic distillation, then the water phase is separated from the condensed azeotrope and the inert organic solvent is recycled to the reaction mixture.

The inert, organic solvent and also excess maleic acid or substituted maleic acid is removed by distillation from the organo(poly)siloxane having anhydride groups which is present after the completion of the second stage.

The organo(poly)siloxane having anhydride groups which is present after the completion of the 2nd stage is optionally equilibrated with organo(poly)siloxanes (4) which are preferably selected from the group consisting of linear organo(poly)siloxanes having terminal triorganosiloxy groups, of the formula

R$_3$SiO(SiR$_2$O)$_r$SiR$^3$, in which R is the same as above and r is 0 or an integer having a value of from 1 to 1,500, linear organo(poly)siloxanes, having terminal hydroxyl groups, of the formula

HO(SiR$_2$O)$_s$H, in which R is the same as above and s is an integer having a value of from 1 to 1,500, cyclic organo(poly)siloxanes of the formula

(R$_2$SiO)$_t$, in which R is the same as above and t is an integer of from 3 to 12, and copolymers formed from units of the formula

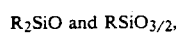

R$_2$SiO and RSiO$_{3/2}$, in which R is the same as above.

The ratios of the organo(poly)siloxanes employed in the 3rd stage of the process of this invention, which is optionally carried out, are determined merely by the desired proportion of anhydride-functional groups in the organo(poly)siloxanes produced in the 3rd stage of the process of this invention and by the desired average chain length.

In the equilibration, which is optionally carried out in the 3rd stage of the process of this invention, it is preferred that acid catalysts be employed which promote the equilibration. Examples of such catalysts are sulfuric acid, phosphoric acid, trifluoromethanesulfonic acid, phosphorus nitride chlorides and acid catalysts which are solid under the conditions of the reaction, such as acid-activated bleaching earth, acid zeolites, sulfonated coal and sulfonated styrene/divinylbenzene copolymer. The preferred catalyst is phosphorus nitride chlorides. Phosphorus nitride chlorides are preferably used in an amount of from 5 to 1,000 ppm by weight (parts per million), and more preferably from 50 to 200 ppm by weight, based on the total weight of the organosilicon compounds employed.

The equilibration which is optionally carried out in the 3rd stage of the process of this invention is preferably carried out at 80.C to 130.C and under the pressure of the ambient atmosphere, that is, at about 1,020 hPa (abs.). If desired, however, it is also possible to use higher or lower pressures. The equilibration is preferably carried out in a 5 to 20 percent by weight solution, based on the total weight of the particular organosilicon compounds employed, in a water-immiscible solvent, such as toluene. The catalyst can be rendered inactive before the mixture obtained in the equilibration is worked up.

The various stages of the process of this invention can be carried out successively in one and the same reaction vessel or in reaction vessels separated from one another. It is preferably carried out successively in one and the same reaction vessel. The process of this invention can be carried out batchwise, semi-continuously or continuously.

The anhydride-functional organo(poly)siloxanes of this invention having the formula (I) in which at least two A radicals are present per molecule can be used in the preparation of organo(poly)siloxane/polyimide copolymers. In this reaction organic diamines, preferably those of the formula

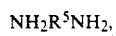

NH$_2$R$^5$NH$_2$, in which R$^5$ represents a divalent hydrocarbon radical having from 2 to 15 carbon atoms per radical, or a divalent radical of the formula

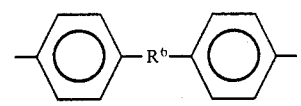

in which R$^6$ is —O—,

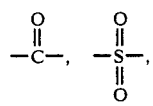

—S— or C$_x$H$_{2x}$ (where x is an integer of from 1 to 5), are reacted with organo(poly)siloxanes having anhydride groups A in the terminal units, and more preferably organo(poly)siloxanes of formula (II), and if appropriate, other organic bisanhydrides, such as benzophenonetetracarboxylic anhydride, benzene-tetracarboxylic anhydride and diphenyl-ether-tetracarboxylic anhydride.

Examples of hydrocarbon radicals represented by R$^5$ are alkylene radicals, cycloalkylene radicals and divalent aromatic hydrocarbon radicals.

The following are examples of organic diamines:

4,4'-diaminodiphenylmethane,
4,4'-diaminodiphenyl sulfone,
4,4'-diaminodiphenyl ether,
p-xylylenediamine,
2,4-diaminotoluene and
1,4-diaminocyclohexane.

The anhydride-functional organo(poly)siloxanes of this invention of formula (I), in which at least two radicals A are present per molecule can also be used as curing agents for epoxy resins. In this reaction, heat-curable epoxy resin compositions are produced which contain an epoxy resin and an organo(poly)siloxane containing anhydride groups A in the terminal units, preferably an organo(poly)siloxane of formula (II) The term epoxy resin includes monomeric, dimeric, oligomeric and polymeric epoxy materials containing one or more functional epoxy groups. Thus, it is possible, for example, to use resins which are obtained from the reaction of bis-(4-hydroxyphenyl)-propane and epichlorohydrin or by the reaction of low-molecular weight phenol/formaldehyde resins (novolak resins) with epichlorohydrin. From 0.5 to 1.0 Mole of the anhydride groups A are preferably present per Mole of oxirane oxygen of the epoxy resin in the heat-curable epoxy resin compositions.

The anhydride-functional organo(poly)siloxanes of this invention can also be used in the treatment of textiles and leather.

EXAMPLE 1

About 294 g of a dimethylpolysiloxane containing dimethylhydrogensiloxy terminal groups and containing 0.34 percent by weight of Si-linked hydrogen are added dropwise at 100° C. to a mixture containing 92.5 g (1.1 Mol) of 2-methyl-3-butyn-2-ol and platinum tetrachloride dissolved in 1-octene and containing 1.5 mg of platinum, calculated as the element. After a reaction time of approximately 4 hours at 100° C., 97 percent of the Si-linked hydrogen have reacted. The excess 2-methyl-3-butyn-2-ol is removed by distillation at 100° C. and at 5 hPa (abs.). The $^1$-H-NMR spectrum of the addition product indicates a ratio of isomers of 65:35 for the Si-linked alkenol groups of the formula —CH=CH—C(OH)(CH$_3$)—CH$_3$
and
J(—C$\underline{H}$=C$\underline{H}$—) = 19 Hz

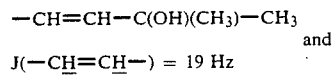

CH$_2$=C—C(OH)(CH$_3$)—CH$_3$

J(C$\underline{H}_2$=C—) = 1,5 Hz

About 196 g (2.0 Mol) of maleic anhydride, together with 400 ml of xylene, are then metered in, and the water formed in the reaction is then removed from the system under reflux conditions for 4 hours. The xylene and excess maleic anhydride are then removed by distillation at 100° C. and at 5 hPa (abs.). This gives 440 g of a dimethylpolysiloxane having terminal, Si-linked anhydride groups of the formula

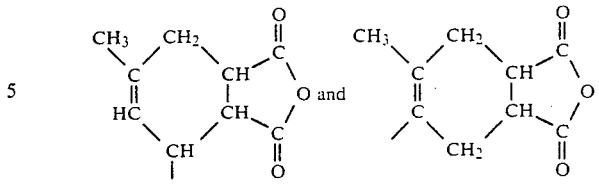

in which the anhydride groups are a mixture of isomers analogous to the above alkenol groups. The dimethylpolysiloxane having terminal anhydride groups has a viscosity of 950 mm$^2$.s$^{-1}$ at 25° C. and an anhydride equivalent of 2.05 mMol/g, and its IR spectrum shows the stretching vibrations for the carbonyl groups at 1,777 cm$^{-1}$ and 1,846 cm$^{-1}$ and the stretching vibration for the double bond in the anhydride groups at 1,610 cm$^{-1}$.

EXAMPLE 2

The procedure of Example 1 is repeated, except that a dimethylpolysiloxane containing 0.29 percent by weight of Si-linked hydrogen instead of 0.34 percent by weight of Si-linked hydrogen is employed as the dimethylpolysiloxane containing dimethylhydrogensiloxy terminal groups. About 40 g of the dimethylpolysiloxane having terminal anhydride groups obtained in this manner are equilibrated at 110° C. with a solution containing 140 g of toluene and 144 g dimethylpolysiloxane which contains Si-linked hydroxyl groups as terminal units and has a viscosity of 80,000 mm$^2$.s$^{-1}$ at 25° C., in the presence of 100 ppm by weight of phosphorus nitride chloride, based on the total weight of the reaction mixture. In order to render the catalyst inactive the reaction mixture is stirred for 15 minutes with acid-activated clay. The reaction mixture is then filtered. The oily product has a viscosity of 320 mm$^2$.s$^{-1}$ at 25° C. and shows the two stretching vibrations for the carbonyl groups in the anhydride groups at 1,779 cm$^{-1}$ and 1,847 cm$^{-1}$ in the IR spectrum. The anhydride equivalent weight of 0.32 mMol/g corresponds to a dimethylpolysiloxane which contains in each case one terminal anhydride group and has a chain length of 80 Si atoms and an average molecular weight of 6,250 g/mol.

EXAMPLE 3

A mixture containing 92.5 g (1.1 Mol) of 2-methyl-3-butyn-2-ol and platinum tetrachloride dissolved in 1-octene and containing 6 mg of platinum, calculated as the element, is heated under reflux. About 182 g of a diorganopolysiloxane which is composed of dimethylsiloxane and methylhydrogensiloxane units and has trimethylsiloxy terminal groups and contains 0.55 percent by weight of Si-linked hydrogen and has a viscosity of 11.2 mm$^2$.s$^{-1}$ at 25° C. are added dropwise over a period of 2 hours. After a reaction time of about 5 hours at 105° C., 98 percent of the Si-linked hydrogen atoms have reacted. The excess 2-methyl-3-butyn-2-ol is then removed by distillation at 100° C. and at 5 hPa (abs.). The hydrosilylation product has a viscosity of 2,080 mm$^2$.s$^{-1}$ at 25° C. After 147 g (1.5 Mol) of maleic anhydride, 200 g of toluene and 2 drops of perchloric acid have been added, the water formed in the reaction is removed from the system. A highly viscous oil, which dissolved in toluene to form a clear solution, is obtained after the toluene and the excess maleic anhydride have been removed by distillation at 105° C. and at 5 hPa (abs.). The diorganopolysiloxane, which has anhydride groups along the siloxane chain, has an anhydride equivalent weight of 2.1 mMol/g, and its IR spectrum shows the two stretching vibrations of the carbonyl groups at 1,777 cm$^{-1}$ and 1,845 cm$^{-1}$.

EXAMPLE 4

About 455 g of a dimethylpolysiloxane, having an average composition of H[Si(CH$_3$)$_2$O]$_{11.5}$Si(CH$_3$)$_2$H and having Si-linked hydrogen in the terminal units are added dropwise at 110° C. over a period of 3 hours to a mixture containing 108 g (1.1 Mol) of 3-methyl-4-pentyn-3-ol and platinum tetrachloride dissolved in 1-octene and containing 3 mg of platinum, calculated as the element. After a reaction time of an additional 2 hours at 115° C., 98 percent of the Si-linked hydrogen have reacted. Excess 3-methyl-4-pentyn-3-ol is removed by distillation at 100° C. and at 5 hPa (abs.). About 147 g (1.5 Mol) of maleic anhydride are then added, together with 200 g of toluene and a catalytic amount of 4 drops of perchloric acid, and the water formed in the reaction is removed completely by azeotropic distillation. The toluene and excess maleic anhydride are then removed by distillation at 100° C. and at 5 hPa (abs.). This gives 552 g of a dimethylpolysiloxane which has an anhydride group in each of the terminal units, has a viscosity of 235 mm$^2$.s$^{-1}$ at 25° C. and has an anhydride equivalent of 1.24 mMol/g. The IR spectrum shows the stretching vibrations for the carbonyl groups of the anhydride groups at 1,775 cm$^{-1}$ and 1,846 cm$^{-1}$ and shows several stretching vibrations for the C=C double bond of the anhydride groups in the region of 1,600 to 1,650 cm$^{-1}$.

EXAMPLE 5

A dimethylpolysiloxane/polyimide copolymer is prepared by mixing 1.6 g (1 mMol) of the dimethylpolysiloxane having terminal anhydride groups which was prepared in Example 4, 2.9 g (9 mMol) of benzophenonetetracarboxylic anhydride, dissolved in 10 ml of dimethylformamide, and 2.0 g (10 mMol) of 4,4'-diaminodiphenylmethane, dissolved in 10 ml of dimethylformamide, together for 2 hours at 25° C. The solution is then heated at 80° C. for 1 hour and is then cured in a circulating air oven at 150° C. for 2 hours. The polyimide contains about 15 percent by weight of dimethylsiloxane units. Thermogravimetric analysis under nitrogen indicates a loss of 10 percent by weight at 490° C. and at a heating rate of 10° C. per minute.

EXAMPLE 6

The procedure of Example 4 is repeated, except that 136.4 g (1.1 Mol) of 1-ethynylcyclohexan-1-ol are substituted for the 108 g (1.1 Mol) of 3-methyl-4-pentyn-3-ol. About 98.5 percent of the Si-linked hydrogen are reacted. Approximately 588 g of an oil having a viscosity of 600 mm$^2$.s$^{-1}$ at 25° C. are obtained after the reaction with maleic anhydride. The dimethylpolysiloxane thus obtained contains terminal anhydride groups, and has an anhydride equivalent of 1.21 mMol/g and its IR spectrum shows the stretching vibrations for the carbonyl groups at 1,779 cm$^{-1}$ and 1,858 cm$^{-1}$ and the stretching vibration for the double bond in the anhydride groups at 1,600 cm$^{-1}$.

EXAMPLE 7

The procedure of Example 4 is repeated, except that 1.1 Mol of 2-methyl-3-butyn-2-ol are substituted for the 1.1 Mol of 3-methyl-4-pentyn-3-ol. The dimethylpolysiloxane having terminal anhydride groups thus obtained is an oil having a viscosity of 275 mm$^2$ s$^{-1}$ at 25° C. and an anhydride equivalent of 1.28 mMol/g.

EXAMPLE 8

About 13.3 g of the dimethylpolysiloxane having terminal anhydride groups whose preparation is described in Example 4 are mixed with 2.6 g of an epoxy compound of the formula

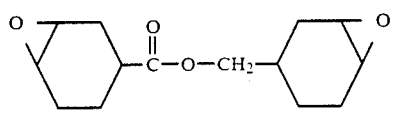

and the mixture is homogenized for 20 minutes at 160° C. Over a period of one week, the product undergoes an increase in viscosity at 25° C. of only approximately 20 percent, starting at 520 mm$^2$.s$^{-1}$. The addition of 50 mg of boron fluoride etherate results in rapid gelling at 25° C. The composition cures completely at 150° C. to give a solid. A cast film 3 mm thick has a Shore-A hardness of 75.

EXAMPLE 9

(a) About 120 g of a copolymer formed from 40 mol percent of trimethylsiloxane units, 34 Mol percent of phenylmethylsiloxane units and 26 Mol percent of phenylsiloxane units are equilibrated at 120° C. with 120 g of a methylhydrogenpolysiloxane containing trimethylsiloxy terminal groups, in the presence of 200 ppm by weight of phosphorus nitride chloride. When the phosphorus nitride chloride has been deactivated by adding 2.5 g of magnesium oxide and filtered, 230 g of a clear, colorless copolymer having a viscosity of 18 mm$^2$ s$^{-1}$ at 25° C. and containing 0.86 percent by weight of Si-linked hydrogen are obtained.

(b) Approximately 230 g (corresponding to 2.0 g of Si-linked hydrogen) of the copolymer having Si-linked hydrogen whose preparation has been described in (a) above, are added dropwise at 102° C. to a mixture containing 185 g of 2-methyl-3-butyn-2-ol and 100 mg of platinum, calculated as the element, in the form of platinum tetrachloride dissolved in 1-octene. After a reaction time of 20 hours at approximately 115° C., about 99 percent of the Si-linked hydrogen of the copolymer have reacted. The volatile constituents are removed by distillation at 100° C. and at 10 hPa. About 600 g of toluene, 300 g of maleic anhydride and 20 mg of concentrated sulfuric acid are then added, and the water formed in the reaction is removed from the system at 115° C. for about 6 hours under reflux with toluene. After 10 g of clay have been added the solution is filtered, and the volatile constituents are removed by distillation at 100° C. and at 10 hPa. This gives 470 g of a silicone resin having Si-linked anhydride groups and having the formula

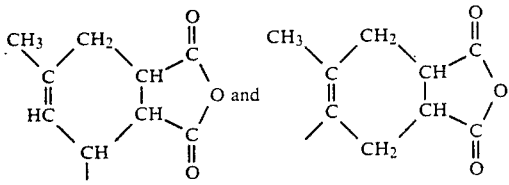

which has a melting range of 50° to 70° C. and an acid number of 210. The IR spectrum shows the stretching vibrations for the carbonyl groups at 1,776 cm$^{-1}$ and 1,847 cm$^{-1}$.

EXAMPLE 10

About 36 mg of $H_2PtCl_6\cdot 3H_2O$ in the form of a 1 percent solution in isopropanol are dissolved in 370 g of 2-methyl-3-butyn-2-ol, and the solution is heated to reflux temperature under an atmosphere of nitrogen. Approximately 268 g of 1,1,3,3-tetramethyldisiloxane are then metered into the solution over a period of about 4 hours at a gently rising temperature (maximum 115° C.). After 99 percent of the Si-linked hydrogen of the 1,1,3,3-tetramethyldisiloxane have reacted, the volatile constituents are removed by distillation at 80° C. and at 15 hPa (abs.). About 600 g of maleic anhydride, 900 g of toluene and 30 mg of concentrated sulfuric acid are then added, and about 70 ml of water are removed as an azeotrope from the system under reflux with toluene over a period of 6 hours. When the reaction mixture has cooled, 20 g of clay are added and the mixture is filtered. The toluene and excess maleic anhydride are then removed by distillation. This gives 900 g (97 percent of theory) of a disiloxane of the formula

having anhydride groups A' which are identical in structure with the anhydride groups from Example 1. The IR spectrum shows the stretching vibrations for the carbonyl groups at 1,775 cm$^{-1}$ and 1,844 cm$^{-1}$.

What is claimed is:

1. An anhydride-functional organo(poly)siloxane having average units of the general formula $$A_a R_b SiO_{\frac{4-(a+b)}{2}}. \tag{I}$$

in which the R(s) are selected from the group consisting of a monovalent hydrocarbon radical and a monovalent halogenated hydrocarbon radical having from 1 to 18 carbon atom(s) per radical, A is a radical selected from the group consisting of the formulas

mixtures thereof, in which R$^1$ is selected from the group consisting of a hydrogen atom, a monovalent hydrocarbon radical and a monovalent halogenated hydrocarbon radical having from 1 to 12 carbon atom(s) per radical, R$^2$ is selected from the group consisting of a hydrogen atom, and a monovalent hydrocarbon radical having from 1 to 12 carbon atom(s) per radical, or the radicals R$^1$ and R$^2$ together represent a divalent hydrocarbon radical having from 3 to 5 carbon atoms per radical, R$^3$ is selected from the group consisting of a hydrogen atom and a monovalent hydrocarbon radical having from 1 to 4 carbon atom(s) per radical, with the proviso that R$^3$ is a hydrogen atom when the R$^1$ and R$^2$ radicals together represent a divalent hydrocarbon radical having from 3 to 5 carbon atoms per radical, R$^4$ is selected from the group consisting of a hydrogen atom, a halogen atom and a cyano radical, a is 0 or 1, with an average of from 0.003 to 1.0, b is 0, 1, 2 or 3, with an average of from 0.05 to 2.5, and the sum of a+b is an average which is not greater than 3, with the proviso that at least one radical A is present per molecule.

2. The anhydride-functional organo(poly)siloxane of claim 1, wherein R$^1$ is a methyl radical and R$^2$, R$^3$ and R$^4$ are each hydrogen atoms.

3. The anhydride-functional organo(poly)siloxane of claim 1, which has the general formula $$A_d R_{3-d}SiO(SiR_2O)_n(SiRAO)_m SiR_{3-d}A_d \tag{II}$$

in which the R(s) are selected from the group consisting of a monovalent hydrocarbon radical and a monovalent halogenated hydrocarbon radical having from 1 to 18 carbon atom(s) per radical, A is a radical selected from the group consisting of the formulas

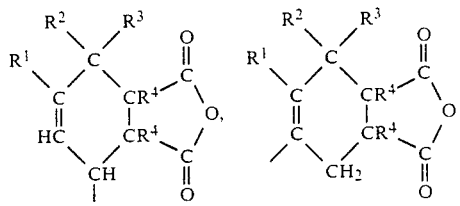

and mixtures thereof, in which R$^1$ is selected from the group consisting of a hydrogen atom, a monovalent hydrocarbon radical and a monovalent halogenated hydrocarbon radical having from 1 to 12 carbon atom(s) per radical, R$^2$ is selected from the group consisting of a hydrogen atom, and a monovalent hydrocarbon radical having from 1 to 12 carbon atom(s) per radical, or the radicals R$^1$ and R$^2$ together represent a divalent hydrocarbon radical having from 3 to 5 carbon atoms per radical, R$^3$ is selected from the group consisting of a hydrogen atom and a monovalent hydrocarbon radical having from 1 to 4 carbon atom(s) per radical, with the proviso that R$^3$ is a hydrogen atom if the R$^1$ and R$^2$ radicals together represent a divalent hydrocarbon radical having from 3 to 5 carbon atoms per radical, R$^4$ is selected from the group consisting of a hydrogen atom, a halogen atom and a cyano radical, d is 0 or 1, n is 0 or an integer of from 1 to 1,500 and m is 0 or an integer of from 1 to 200, with the proviso that at least one radical A is present per molecule and the ratio of n:m is not greater than 200.

4. The anhydride-functional organo(poly)siloxane wherein R$^1$ is a methyl radical and R$^2$, R$^3$ and R$^4$ are each a hydrogen atom.

5. A process for preparing the anhydride-functional organo(poly)siloxane of claim 1, which comprises in a first stage, reacting an acetylenic alcohol selected from the group consisting of a secondary and tertiary acetylenic alcohol (1) with an organo(poly)siloxane (2) having at least one Si-linked hydrogen atom in the presence of a catawith (3) which promotes the addition of Si-linked hydrogen to an aliphatic multiple bond, and then in a 2nd stage, reacting the alkenol groups of the organo(poly)siloxane obtained in the 1st stage with an anhydride selected from the group consisting of maleic anhydride and a substituted maleic anhydride, in which the elements of water are eliminated by an intramolecular reaction from the alkenol groups and the anhydride is then added on thereto in the manner of a Diels-Alder reaction.

6. The process of claim 5, wherein the reaction between the alkenol groups of the organo(poly)siloxane obtained in the first stage with the anhydride is conducted in the presence of an acid catalyst.

7. The process of claim 5, wherein the anhydride-functional organo(poly)siloxane obtained from the 2nd stage is equilibrated with an organo(poly)siloxane (4) selected from the group consisting of linear organo(poly)siloxanes containing terminal triorganosiloxy groups, linear organo(poly)siloxanes containing terminal hydroxyl groups, cyclic organo(poly)siloxanes and copolymers formed from diorganosiloxane and monoorganosiloxane units.

8. The process of claim 7, wherein the equilibrated process is conducted in the presence of an acid catalyst.

9. The process of claim 5, wherein the acetylenic alcohol (1) is an acetylenic alcohol of the general formula $$HC \equiv C - C(OH)R^1 - CHR^2R^3,$$

in which $R^1$ is selected for the group consisting of a hydrogen atom, a monovalent hydrocarbon radical and a monovalent halogenated hydrocarbon radical having from 1 to 12 carbon atom(s) per radical, $R^2$ is selected from the group consisting of a hydrogen atom, and a monovalent hydrocarbon radical having from 1 to 12 carbon atom(s) per radical, or the radicals $R^1$ and $R^2$ together represent a divalent hydrocarbon radical having from 3 to 5 carbon atoms per radical, $R^3$ is selected from the group consisting of a hydrogen atom and a monovalent hydrocarbon radical having from 1 to 4 carbon atom(s) per radical, with the proviso that $R^3$ is a hydrogen atom if the two radicals $R^1$ and $R^2$ together represents a divalent hydrocarbon radical having from 3 to 5 carbon atoms per radical.

10. The process of claim 5, wherein the acetylenic alcohol (1) is 2-methyl-3-butyn-2-ol.

11. A process for preparing organopolysiloxane-/polyimide copolymers which comprises reacting the anhydride-functional organo(poly)siloxane of claim 1 with an organic diamine of the formula $$NH_2R^5NH_2$$

in which $R^5$ is selected from the group consisting of a divalent hydrocarbon radical having from 2 to 15 carbon atoms per radical and a divalent radical of the formula

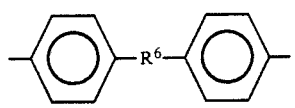

in which $R^6$ is selected from the group consisting of

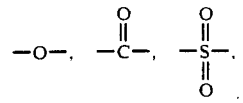

—S— and $C_xH_{2x}$, where x is an integer of from 1 to 5.

12. The process of claim 11, wherein the anhydride-functional organo(poly)siloxane has average units of the general formula $$A_aR_bSiO_{\frac{4-(a+b)}{2}}, \qquad (I)$$

in which the R(s) are selected from the group consisting of a monovalent hydrocarbon radical and a monovalent halogenated hydrocarbon radical having from 1 to 18 carbon atom(s) per radical, A is a radical selected from the group consisting of the formulas

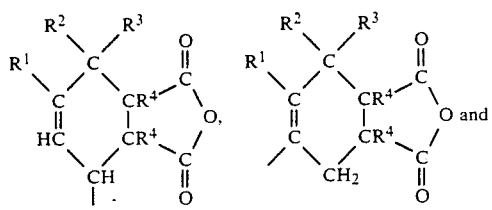

mixtures thereof, in which $R^1$ is a methyl radical and $R^2$, $R^3$ and $R^4$ are each hydrogen atoms, a is 0 or 1, with an average of from 0.003 to 1.0, b is 0, 1, 2 or 3, with an average of from 0.05 to 2.5 an the sum of a+b is an average which is not greater than 3, with the proviso that at least one radical A is present per molecule.

13. A process for forming a curable epoxy resin, which comprises mixing the anhydride-functional organo(poly)siloxane of claim 1, with a heat-curable epoxy resin.

14. The process of claim 13, wherein the anhydride-functional organo(poly)siloxane has average units of the general formula $$A_aR_bSiO_{\frac{4-(a+b)}{2}}, \qquad (I)$$

in which the R(s) are selected from the group consisting of a monovalent hydrocarbon radical and a monovalent halogenated hydrocarbon radical having from 1 to 18 carbon atom(s) per radical, A is a radical selected from the group consisting of the formulas

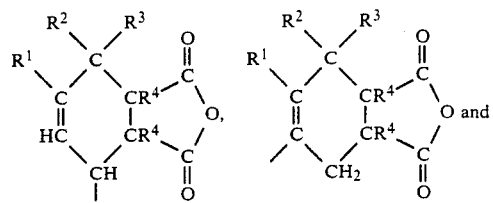

mixtures thereof, in which $R^1$ is a methyl radical and $R^2$, $R^3$ and $R^4$ are each hydrogen atoms, a is 0 or 1, with an average of from 0.003 to 1.0, b is 0, 1, 2 or 3, with an average of from 0.05 to 2.5 and the sum of a+b is an average which is not greater than 3, with the proviso that at least one radical A is present per molecule.

15. A cured epoxy resin which is obtained by heating the mixture of claim 13.

16. A cured epoxy resin which is obtained by heating the mixture of claim 14.

* * * * *

UNITED STATES PATENT AND TRADEMARK OFFICE
CERTIFICATE OF CORRECTION

PATENT NO. : 5,015,700

DATED : May 14, 1991

INVENTOR(S) : Dr. Christian Herzig and Josef Esterbauer

It is certified that error appears in the above-identified patent and that said Letters Patent is hereby corrected as shown below:

Column 17, line 3 after "a" delete "catawith" and insert

---catalyst---.

Signed and Sealed this

Fifteenth Day of September, 1992

Attest:

DOUGLAS B. COMER

*Attesting Officer*     Acting Commissioner of Patents and Trademarks